May 22, 1945. A. E. WATERMAN 2,376,641
TEMPERATURE CONTROLLING DEVICE FOR INCUBATORS
Filed June 10, 1942 3 Sheets-Sheet 3

INVENTOR.
ARTHUR E. WATERMAN
BY
ATTORNEY

Patented May 22, 1945

2,376,641

UNITED STATES PATENT OFFICE 2,376,641

TEMPERATURE CONTROLLING DEVICE FOR INCUBATORS

Arthur E. Waterman, Fort Atkinson, Wis., assignor to James Manufacturing Company, Fort Atkinson, Wis., a company of Wisconsin Application June 10, 1942, Serial No. 446,489

3 Claims. (Cl. 119—37)

The present invention relates to a device adapted to control the temperature and prevent over-heating in an incubator after the birds begin to generate animal heat, at which time considerable animal heat is generated. In fact, at times enough animal heat is generated to overheat the eggs even if the regular heating mechanism has been off for some time.

The present invention is particularly adapted for use in an incubator which operates on the single stage principle, wherein the cabinet is first filled with full incubating trays and after about 19 days the eggs are transferred to hatching trays which are inserted in the cabinet in place of the incubating trays, the cabinet being provided with convenient means for conditioning the air during the full cycle of incubating and hatching.

It is desired to create an environment or condition within the cabinet conducive to proper development of the chick germ and growth of the chick embryo.

This invention is particularly useful in incubators of the class after the 18th or 19th day and until the eggs are hatched. During approximately the first 15 days of the incubation period, for chicken eggs, the temperature control thermostat is set so that the average dry bulb temperature within the cabinet is approximately $99\frac{1}{2}°$. It is desired that the maximum temperature never rise above $100\frac{1}{2}°$. During this period little heat is furnished by the egg itself.

After a certain stage of embryo development animal heat is given off from the egg and from this stage until the chick has hatched, the eggs themselves may maintain the heat within the cabinet independent of the heating element. During this latter period, it is important to have means for guarding against too great a rise in temperature. In other words, provision must be made to dissipate excessive egg heat and at the same time it is beneficial to add some moisture to the circulating air.

In my device the desired results are accomplished by introducing cold water into preferably a cooling pan which is in heat exchange contact with the circulating air by means of a thermally controlled cold water valve. The surplus water from the cooling pan is permitted to flow down into the humidity or evaporator pan where it absorbs latent heat through evaporation and adds to the humidity of the circulating air.

In the present invention, a low temperature limit is predetermined through the adjustment of a thermostat and the high temperature limit is controlled by means of a cooling thermostat; that is, there are two thermostats, one to contact the resisters when the temperature falls below a predetermined point and to disconnect the resisters when the temperature rises to a predetermined point, the other thermostat being adapted to operate the cooling water valve as herebefore outlined.

From approximately the 14th or 15th day until the chicks are hatched, the average temperature within the cabinet will gradually increase until a predetermined maximum temperature is reached, at which time the cooling valve is turned on by the cooling thermostat.

It will be seen that when a conventional incubating and hatching cabinet is equipped with my temperature controlling device, the two thermal devices, cooperating with the body heat generated, positively and accurately control the temperature of the interior of the cabinet. With the use of my device the humidity within the cabinet is controlled by evaporating the moisture and this moisture, associated with my improved cooling device and the means for automatically heating the air in the cabinet, provides an over all controlling means.

As illustrated in the drawings and as will hereinafter be described, I provide preferably a single cabinet for incubating and hatching the eggs. All eggs in the cabinet will continue in the same stage of development, therefore the eggs will be hatched at approximately the same time.

With my device, low and high limits on temperature are established in which the eggs themselves may adjust the temperature within these limits during the latter stages of incubation and during hatching in accordance with natural development.

To these and other useful ends, my invention consists of parts, combinations of parts, or their equivalents, and mode of operation, as hereinafter set forth and claimed and shown in the accompanying drawings in which:

Figure 1:
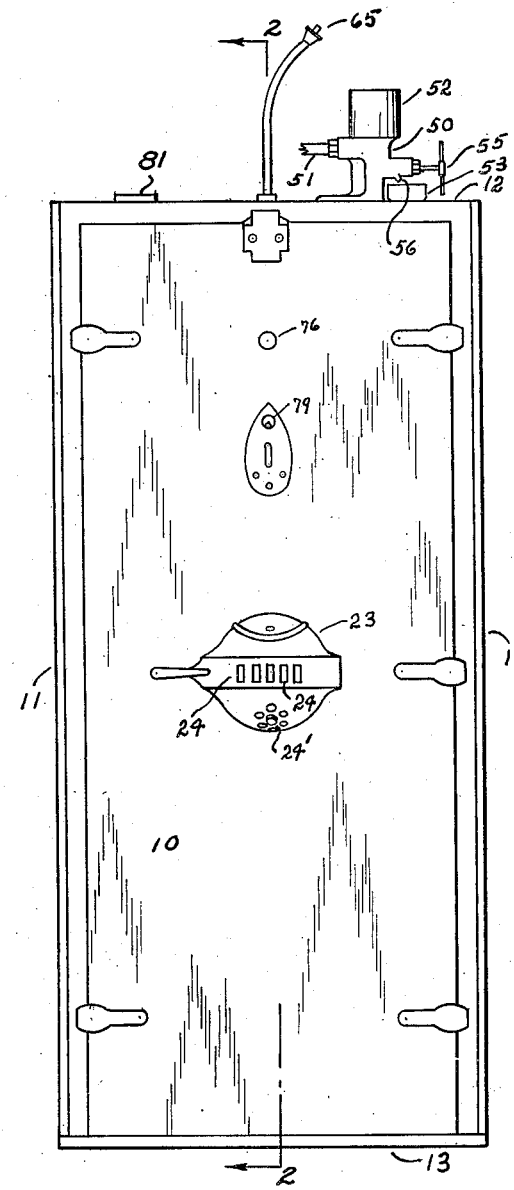
Fig. 1 illustrates a front view of a conventional incubator equipped with my invention.
Figure 2:
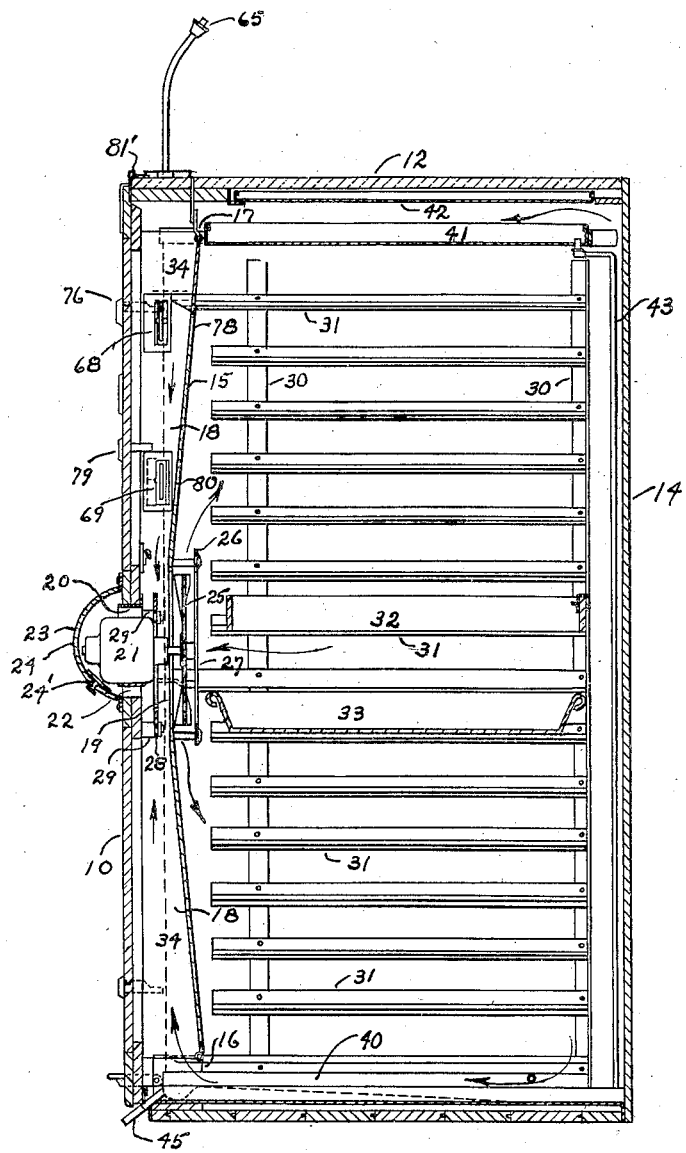
Fig. 2 illustrates a sectional view taken on lines 2—2 of Figure 1.
Figure 3:
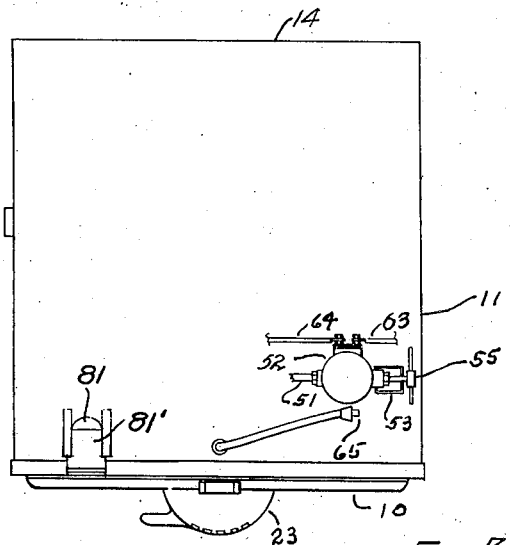
Fig. 3 illustrates a top view of the device shown in Figures 1 and 2.

In Figures 1, 2 and 3, numeral 10 designates the front door of an incubator cabinet and 11—11 designates the side panels of the cabinet. Numerals 12 and 13 designate the top and bottom panels of the cabinet. Numeral 14 designates the rear panel of the cabinet. The door of the cabinet carries a partition 15 which terminates at its bottom and top as at 16 and 17. The side edges of partition 15 are provided with forwardly extending flanges 18—18 which contact the inside surface of the door near the inside surface of panels 11 forming an air duct 34 for about the width of the door.

Panel 15 is provided with an opening 19 at its vertical center and door 10 is provided with an aperture 20. A motor 21 is centrally positioned within aperture 20 providing an annular air inlet space 22.

A decorative cap 23 is positioned over the outer end of the motor. Permanent air inlets 24 are provided in member 23. These inlets are adapted to supply the minimum amount of fresh air needed. An adjustable air inlet 24' is provided in member 23 so the additional volume of air permitted to enter the cabinet may be manually controlled. Motor 21 is provided with a fan 25 which is positioned adjacent the plane of the inside of panel 15 and extends radially slightly less than the diameter of opening 19 so member 15 may be removed bodily or opened hinge-like so as to expose the parts within the duct 34 for cleaning and inspection purposes without removing the fan; clearly the centrifugal action of the fan will create a vacuum between panel 15 and the door so air will be drawn toward the motor from the top and bottom of the cabinet and through annular opening 22.

An annular plate 26 is provided having a centrally positioned aperture 27 of about the same diameter as aperture 19 so the vacuum created by the rear side of the fan will draw air from the center of the cabinet through aperture 27; thus when the fan is in operation, air will travel somewhat on the lines indicated by arrows in Figure 2.

Figure 4:
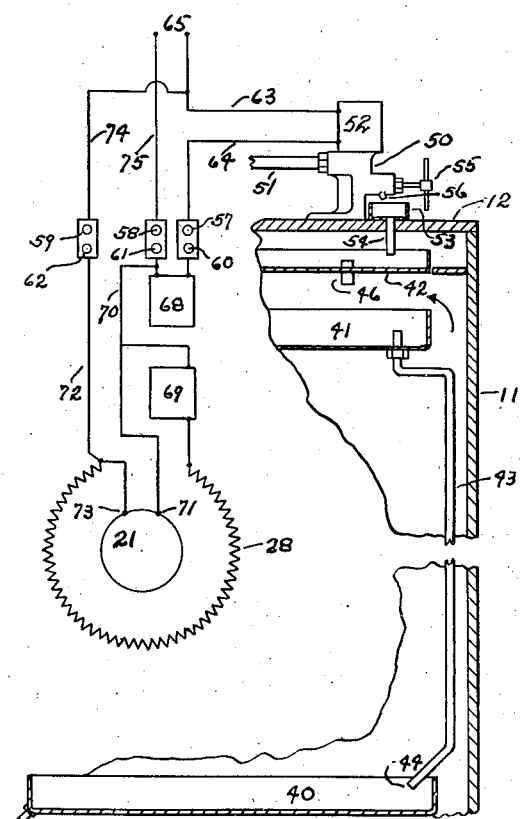
Fig. 4 is a diagrammatic drawing illustrating the humidity pans, the cooling pan, electrically controlled water valve, the thermostats, fan motor and resister all in circuit.

I provide a circular resister 28 in the position shown in Figures 2 and 4, the resister being supported on the door by suitable insulators 29. It will be seen that the major part of the circulating air will pass this resister so that the temperature of the air can be maintained on the on and off principle by means of a thermally controlled switch as will hereinafter apear.

At each side of the cabinet I mount spaced posts 30—30 to which vertically spaced tray supporting tracks 31 are secured; thus trays may be inserted drawer-like into the cabinet in the conventional way, one above the other.

I provide incubating and hatching trays 32 and 33 which are interchangeable and illustrate one of each in position on guides 31 in Figure 2. These trays are preferably of the design illustrated in a co-pending application Serial 352,875, filed August 16, 1940, issue No. 2,310,534, February 9, 1943.

Clearly my device may be installed in any style incubator but it is particularly adapted for a single stage incubator as illustrated wherein all of the incubating trays are first filled with eggs and then about the 19th day or about when the chicks begin to pip, the eggs are transferred from incubating trays 32 to hatching trays 33 as described in the next above mentioned co-pending application.

As will hereinafter appear, the air is conditioned to suit the entire single stage process or from the time the eggs are placed in the incubating cabinet until the chicks are hatched.

Referring particularly to Figure 4, it will be seen that an evaporator pan 40 is preferably positioned in the bottom of the cabinet and another evaporator pan 41 is positioned in the top of the cabinet. Pan 40 is far enough below the bottom tray to permit circulating air to pass over the surface of the water in the pan and pan 41 is positioned directly above the top tray and a short distance below cooling pan 42 so the air passing between these pans will be in heat exchange contact with the water in these two pans.

Pan 41 is provided with an overflow pipe 43 which drains into pan 40 as at 44. Pan 40 at its front end is provided with a drain or overflow pipe 45. Suitable means may be provided in pans 40 and 41 to expose more or less surface area of the water to the passing air, for example as illustrated in Patent No. 2,267,244, December 23, 1941, Markey, see member 10 in Figure 3. The method is too well known to require further description.

Pan 42 is provided with an overflow pipe 46 so the surplus water in this pan will drain into pan 41 and in turn the surplus water in pan 41 will drain into pan 40 and finally if there is a surplus it will escape from this pan through outlet 45.

I mount a valve 50 preferably on the top of the cabinet as shown, having a cold water supply connection 51. The valve is held normally closed and adapted to be opened by means of a solenoid 52. The valve and solenoid are too well known to require further description. When valve 50 is opened by energizing the coil of member 52, water will flow from member 56 into a pan 53 from whence the water overflows into pan 42 through tube 54. Valve 50 is adapted to be operated on the on and off principle.

I provide a manually controlled outlet valve 55 so when valve 50 is open, valve 55 may be adjusted to the desired flow of water into pan 53 through a nozzle 56.

In the upper panel of the cabinet, I provide inlet switch contact members 57, 58 and 59 and outlet switch members 60, 61 and 62. Adjacent switch members are connected together when the door is closed by means of suitable plates on the door as disclosed in Patent No. 2,267,244, December 23, 1941 (see Figures 2, 4 and 5). A wire 63 operatively connects member 52 to the supply line switch as at 65 which is located outside of the cabinet or in some convenient place on the wall of the building.

A wire 64 forms an operating connection between members 52 and 57. Members 60 and 61 are connected to a thermally controlled switch 68 as illustrated and another thermally controlled switch 69 is connected to member 61 by means of wire 70. Wire 70 is connected to motor 21 as at 71 and also to member 69 as illustrated.

Resister 28 is connected to switch 69 as illustrated and to member 62 by means of wire 72 as illustrated. Wire 72 is further connected to motor 21 as at 73.

Member 59 is connected to wire 63 by means of wire 74 and member 58 is connected to the line switch at 65 by means of wire 75; thus when the door is closed motor 21 is energized and heater 28 and valve 50 with their thermostats 69 and 68 are connected to the circuits. Member 68 is positioned in duct 34 about as shown in Figure 2 having preferably an exterior manually controlled adjusting means 76. Directly in rear of member 68 I provide an opening 78 in member 15.

Member 69 is positioned in duct 34 as illustrated in Figure 2 having preferably an exterior manually controlled means 79 and plate 15 having an opening 80 directly in line with member 69. It will be seen that members 68 and 69 are in the path of the circulating air within the upper end of duct 34 and that these members will be somewhat influenced by the air in the cabinet because of openings 78 and 80.

Member 69 is adapted to maintain a predetermined minimum temperature in the cabinet and member 68 is adapted to open valve 50 when exposed to air above a predetermined maximum temperature. For example, during very warm weather and when there is enough body heat released to raise the temperature of the circulating air in the cabinet above a predetermined point, then valve 50 will be opened and the cold water in pan 42 will act to cool the circulating air in the cabinet.

Member 69 is adapted to maintain the normal temparature of the air in the cabinet on the on and off principle. However this device cannot prevent an abnormal rise in temperature caused by released body heat at which time member 68 will act to prevent a further rise in temperature as already described.

The small volume of fresh air permitted to pass into the cabinet at 24 escapes through an adjustable outlet as at 81. A suitable gate valve 81' is slidably mounted so the opening in an outlet 81 may be adjusted.

It will be understood that it is desired to discontinue the operation of motor 21 when the door of the cabinet is open. This occurs only infrequently and at very short intervals particularly when the trays are being changed; however without the action of the fan, the air within the cabinet will largely be dormant and immediately upon closing the door, circulation begins and the automatic parts will again function as usual.

In all modern incubators, means (not shown), are provided whereby the eggs may be turned at stated intervals. Such means are generally manually operated.

Having thus shown and described my invention, I claim:

1. An incubator of the class described, comprising a cabinet having a number of egg holding trays therein, means for circulating air and for maintaining a predetermined minimum temperature thereof, a cooling water pan positioned above the path of the circulating air and in contact therewith, a cooling water supply valve having an outlet to said cooling water pan, electrical means for opening the valve, a thermally controlled switch positioned in the cabinet and having an operating connection to said valve operating means and adapted to cause the valve to open when the circulating air rises above a predetermined temperature, an evaporator pan positioned below said first pan and cooperating therewith to form an air passageway therebetween, and an overflow drain from said water pan to said evaporator pan whereby the first pan may act to cool the circulating air and the evaporator pan may act to cool by evaporation and humidify the circulating air.

2. A device as recited in claim 1 including; a third pan positioned in the bottom of said cabinet and arranged so the circulating air passes over the pan, and an overflow drain from said evaporator pan to the third pan.

3 A device as recited in claim 1 including; said valve outlet having a manually adjustable valve therein adapted to determine the volume of flow from said first valve when the first valve is open, and an opening in said outlet positioned between the top of the cabinet and said last valve adapted to expose to view the water being fed to said cooling water pan.

ARTHUR E. WATERMAN.